Figure 1:
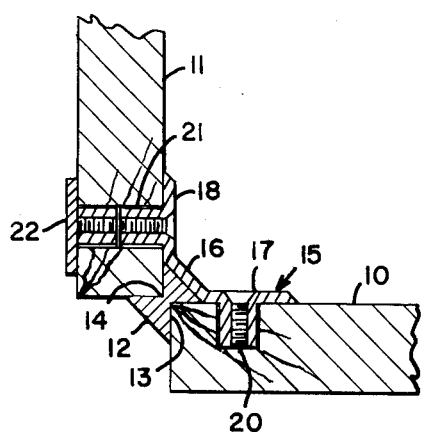

United States Patent [19]
Kristiansen

[11] 4,014,618
[45] Mar. 29, 1977

[54] CORNER STRUCTURE
[76] Inventor: Kai Hestbech Kristiansen, Vilh Kyhnsalle 3, Hojbjerg, Denmark
[22] Filed: July 3, 1975
[21] Appl. No.: 593,147
[30] Foreign Application Priority Data

July 8, 1974 Denmark ............................ 3646/74

[52] U.S. Cl. ............................. 403/205; 403/231;
403/403; 248/188; 52/285; 52/282
[51] Int. Cl.² ......................................... F16B 12/00
[58] Field of Search .......... 52/753 D, 753 Y, 753 J,
52/758 H, 282, 288; 403/231, 403, 382, 205;
248/188

[56] References Cited

UNITED STATES PATENTS

| | | | |
|---|---|---|---|
| 392,808 | 11/1888 | Kastler | 52/753 D |
| 632,007 | 8/1899 | Broome | 52/753 D |
| 636,434 | 11/1899 | Kendall | 248/188 |
| 913,537 | 2/1909 | Moore | 52/753 D |
| 924,703 | 6/1909 | Streed | 52/753 D |
| 1,579,134 | 3/1926 | Nusbaum | 403/205 X |
| 2,456,929 | 12/1948 | Dee | 52/753 D |
| 3,741,425 | 6/1973 | Freeman | 52/753 D |

FOREIGN PATENTS OR APPLICATIONS

| | | | |
|---|---|---|---|
| 985,658 | 3/1951 | France | 248/188 |
| 84,235 | 11/1964 | France | 403/231 |

*Primary Examiner*—Andrew V. Kundrat
*Attorney, Agent, or Firm*—Lawrence Rosen; E. Janet Berry

[57] ABSTRACT

A corner structure for use in shelves, cabinets, boxes, and similar box shaped objects is described, wherein rectangular and/or polygonal panels are assembled by means of a rod-shaped junction of substantially hourglass cross-section. The junction is provided with or may be used in combination with separate uniting members having projections designed to be attached to the panels by means of screws or in other suitable manner.

4 Claims, 14 Drawing Figures

U.S. Patent    Mar. 29, 1977    Sheet 1 of 2    4,014,618

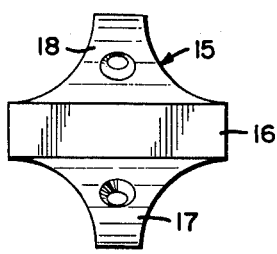
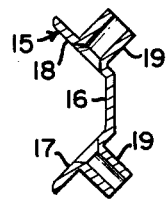
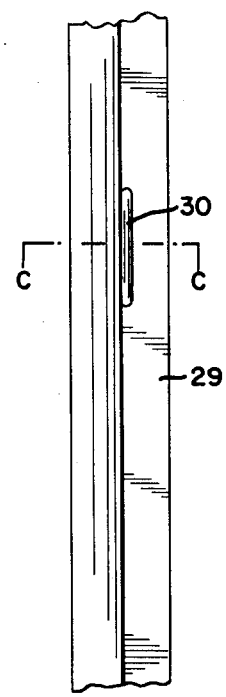
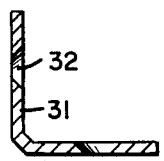
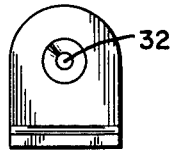
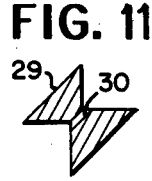
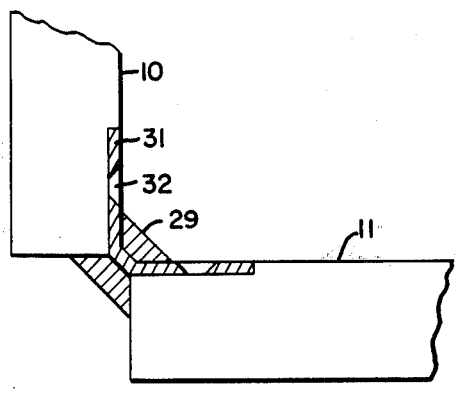

CORNER STRUCTURE

This invention relates to a corner structure for use in shelves, cabinets, boxes, and similar boxshaped objects composed of rectangular or polygonal panels, or combinations of rectangular and polygonal panels.

The object of the invetion is to provide a simple design of a corner structure which is exceedingly stable, but easily assembled and separated, thus faciliating rearrangement of, for example, the subdivision of shelves.

According to the invention, this object is attained in a corner structure comprising a rod-shaped junction of substantially hourglass-shaped cross-section having projections or being combined with uniting members having projections bearing against the surfaces of two panels to be united to form a corner. The junction is adapted to be attached to the panels by means of screws or in other appropriate manner.

Thus, the main component of the corner structure is a junction which is rod-shaped and has a cross-section shaped like an hourglass. The said junction will generally be cut to a length corresponding to the border length of the panels to be united at a corner. The junction is preferably made from metal, particularly aluminum or a lightweight alloy, but may also be made from other material, for example plactic which may be fibre-reinforced. The hourglass-shape is formed by depressions in opposite surfaces of the junction, said depressions having surfaces forming an angle to one another in order to bear against the surface and border of the two panels to be assembled. In most cases, the cross-section of the junction will be designed so as to assemble the two panels at a right angle to one another, but the design may also be such that the panels do not form a right angle in the assembly.

In order to fasten the junction to the panels, the junction may have projections as a continuation of one of the surfaces of the angular depressions, and the said projections may be fastened to the panels to be assembled to a corner by means of screws or other fastening members. In that case, the said projections may form continuous flanges along the length of the junction to make it possible to manufacture the junction by rolling or by extrusion.

Particularly appropriate, according to the invention, however, the uniting members are separate, flat pieces having a body width equal to that of the junctions, said body having a projection on each side, forming an angle with the body, the projections mutually forming an angle, preferably a right angle, corresponding to the angle which is to be formed by the panels being assembled at the corner. This makes the manufacture particularly simple, because the junctions of hourglass-shaped cross-section can be made by rolling or by extrusion as above mentioned, but with less consumption of material, whereas the uniting members can be made by punching, followed by bending to the desired shape.

Whether the projections are parts of the junction or of the said separate uniting members, according to the invention they are advantageously made with projecting bushings fitting into openings in the panels to be assembled, said openings going through all or only part of the way through the panels. with On the one hand this makes the assembling easier, the bushings and the openings preferably being made for interference fitting of the bushings; and on the other hand the bushings may have interior threading to fit machine screws so that screws need not be fastened into the panel material itself. In partitions, the uniting members on each side are thus appropriately held together by means of a single screw passing through the panel, or else a capped bushing is fitted into the opening from the opposite side of that from which the bushing of the uniting member is inserted.

The uniting members having bushings can either be cast in their final shape, or they can be made by punching in which case the bushings are made separately and crimped, soldered or welded into openings in the projections.

To achieve perfectly tight assembling, according to the invention, the corner structures are made with junctions of a length corresponding to the length of the borders of the panels to be assembled at a corner.

In a particularly simple and appropriate embodiment of the corner structure of the invention, the junction has slots through the narrowest part of the hourglass-shaped cross-section, into which slots flat uniting members are inserted, the ends of which are then bent the same way to rest against the slanting surfaces and project at an angle to one another over one of the two parallel outer surfaces of the junction.

One or several of such uniting members can be inserted into each individual junction, and there is no need for special fastening measures, because they are fixed by the bending of the ends thereof. In the projecting ends there are one or more screw holes for use in attaching them to the panels. The panels may have recesses into which the projections of the uniting members are countersunk so that their outer surfaces are flush with the panel surface.

This simple type of structure is as readily usable in a corner structure comprising two panels, in a T-structure, and in a cross structure.

The sides of the junctions which do not come into contact with the panels, can be shaped in various manners. In the simplest form, they have plane surfaces; but they may also be arcuately formed, either convex or concave. When separate uniting members are used, these are then made with correspondingly arcuate bodies.

Figure 2:
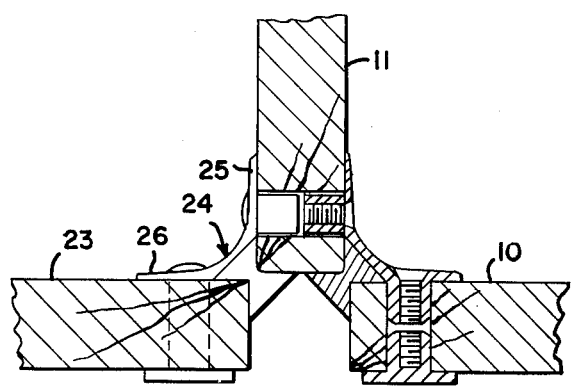
Figure 3:
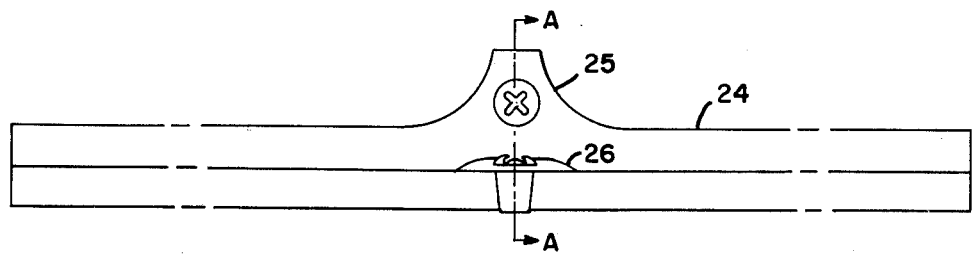
Figure 4:
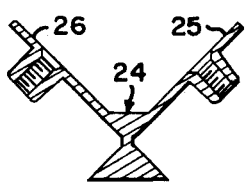
Figure 5:
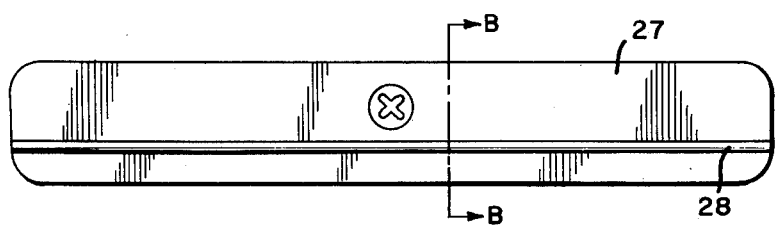
Figure 6:
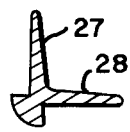
Figure 7:

Some embodiments of the corner structure of the invention and of the junctions and uniting members used therein are shown in the accompanying drawings, in which FIG. 1 shows a cross-section through a structure comprising two panels in a right-angled corner, FIG. 2 shows a cross-section of three panels assembled in T-shape, FIG. 3 shows a front elevation of a junction having projections for the mounting, FIG. 4 shows a cross-section along the line A—A in FIG. 3, FIG. 5 shows a front elevation of a junction with continuous flanges for the mounting, FIG. 6 shows a cross-section along the line B—B in FIG. 5, FIG. 7 shows a cross-section of a junction without projections, FIG. 8 shows a plan view of a uniting member belonging thereto, and FIG. 9 shows a front elevation thereof, FIG. 10 shows a front elevation of another embodiment of the junction, FIG. 11 shows a cross-section along the line C—C in FIG. 10, FIG. 12 shows a cross-section of a uniting member for use together with the junction in FIGS. 10 and 11, FIG. 13 shows a plan view of this uniting member, and FIG. 14 shows a corner structure made with the junction and uniting members as shown in FIG. 10—13.

The corner structure shown in FIG. 1 comprises two panels 10 and 11 at a right angle to one another. Panels 10 and 11 are held together by means of a junction 12 of hourglass-shaped cross-section as shown in FIG. 7, the borders of the two panels are inserted as far as possible into the depressions 13 and 14 in the junction.

The panels are held together by one or more uniting members 15 of the shape shown in FIGS. 8 and 9. Members 15 each have a flat body 16 of the same width as the flat sides of the junction 12, and projections 17 and 18 forming angles of respectively 45° and 135° with said body, said projections being intended to abut against surfaces of the panels 10 and 11 as shown in FIG. 1.

The projections 17 and 18 have bores and, on the underside, bushings 19 with internal threading; said bushings 19 are dimensioned to have an interference fit in bores 20 and 21 in the panels 10 and 11. If desired, the bushings may be slotted and slightly conical so as to be widened when a uniting screw is used in the assembling of the corner structure. This may be useful, when it is not desirable that a bore, such as the bore 20, go all through the panel, but is superfluous when a screw is passed through the bushing and fastened in the panel 10.

The bore may also extend completely through a panel, such as the bore 21, when using an internally threaded capped bushing 22, said bushing being inserted from the side of the panel opposite to that against which the projection 18 bears, a throughgoing screwbolt assembling the bushings 19 and 22.

The structure shown in FIG. 2 comprises three panels 10, 11, and 23 in an assembly of cross-sectional T-shape. The panels 10 and 11 are assembled as described above. A junction 24 as shown in FIG. 3 has been used to assemble the panels 10 and 23, said junction having projections 25 and 26 similar to the projections on the loose uniting members 15. Long junctions may have several suitably spaced projections 25 and 26.

Another embodiment of the junction is that shown in FIGS. 5 and 6. Here, the projections 25 and 26 have been replaced by flanges 27 and 28, extending throughout the length of the junction.

FIGS. 10 and 11 show still another embodiment, where a junction 29 is provided with one or more throughgoing slots 30 into each of which can be inserted a flat uniting member 31, which is then bent into a shape as shown in FIGS. 12 and 13, whereby it is attached to the junction 29. The ends of the uniting member, extending beyond the junction, are provided with one or several screw holes 32.

FIG. 14 shows a corner structure made with the junction shown in FIG. 10, and it will be noted that the ends of the uniting member 31 are countersunk in the panels 10 and 11.

What is claimed is:

1. A corner structure for use in shelves, cabinets, boxes and similar boxshaped objects, which are made from rectangular panels, said corner structure comprising a recessed rod-shaped junction of substantially hourglass-shaped cross-section into the recesses of which the borders of the panels are received, said junction having projections extending from each of the recesses to bear against the inner surfaces of the panels to be assembled at a corner, said projections being designed so that they can be attached to the panels by suitable fastening means.

2. A corner structure according to claim 1, characterized in that the projections of the junction form parts of separate, flat uniting members having a body width equal to that of the junctions, said body of a uniting member having a projection on each side forming an angle with the body, the projections themselves forming an angle, corresponding to the angle, under which the panels are to be assembled to form a corner.

3. A corner structure according to claim 1, characterized by junctions of a length corresponding to the border length of the panels used in the corner structure.

4. A corner structure according to claim 1, characterized in that a junction is used, having throughgoing slots at the narrowest part of the hourglass-shaped cross-section, into each of which slots a flat uniting member has been inserted, and the ends thereof have been bent the same way to bear against slanting surfaces bounding the hourglass-shape.

* * * * *